(No Model.)  2 Sheets—Sheet 1.
W. W. BEACH.
WINKER FOR BRIDLES.
No. 311,561. Patented Feb. 3, 1885.
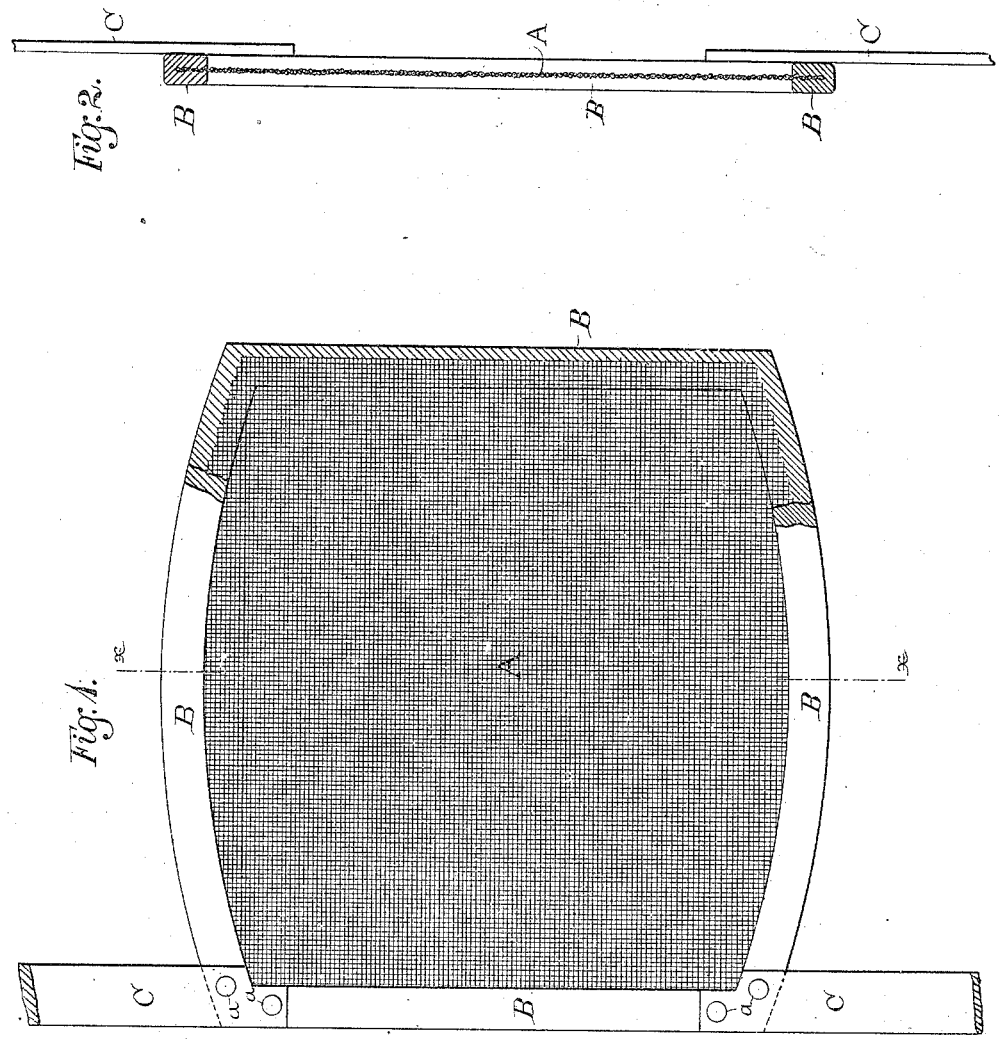
WITNESSES:
Gunvald Aas.
John H. Fisher
INVENTOR
William W. Beach
BY James A. Whitney
ATTORNEY (No Model.) 2 Sheets—Sheet 2.
W. W. BEACH.
WINKER FOR BRIDLES.
No. 311,561. Patented Feb. 3, 1885.
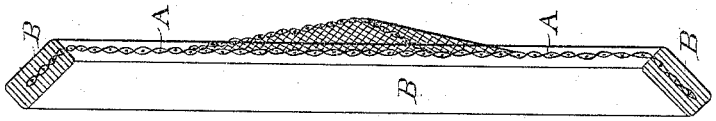
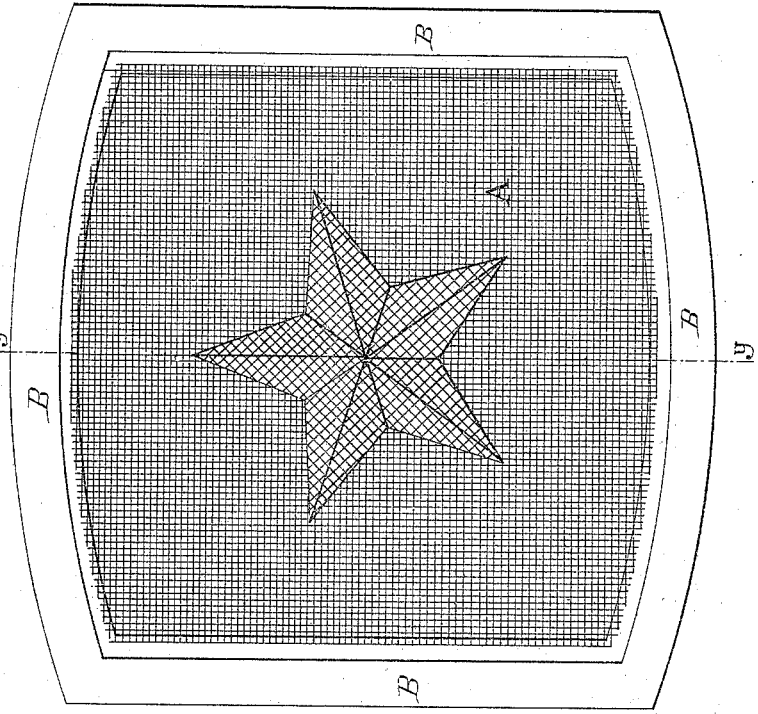
WITNESSES:
Gunvald Aas.
John H. Fisher
INVENTOR
William W. Beach.
BY James A. Whitney
ATTORNEY

UNITED STATES PATENT OFFICE.

WILLIAM W. BEACH, OF NEW YORK, N. Y., ASSIGNOR TO DAVID R. MORSE, OF BROOKLYN, N. Y., AND RANDOLPH M. STELLE, OF PLAINFIELD, N. J.

WINKER FOR BRIDLES.

SPECIFICATION forming part of Letters Patent No. 311,561, dated February 3, 1885.

Application filed June 27, 1884. (No model.)

*To all whom it may concern:*

Be it known that I, WILLIAM W. BEACH, of the city, county, and State of New York, have invented certain Improvements in Blinders or Winkers for Headstalls, Bridles, &c., of which the following is a specification.

The blinder or winker for harness in ordinary use is composed of leather or other solid material, and, when in place upon the horse's head and in the usual position with reference to the eyes of the animal, acts as a deflector, directing currents of air into the eyes of the animal, which impinge upon the eyes and are more or less productive of harm, and, furthermore, produce even greater mischief by carrying dust and other injurious particles into the eyes.

The object of my invention is to provide a blinder or winker of novel construction which will serve all the purposes of the ordinary blinder or winker, and at the same time permit the currents of air to pass through the blinder or winker, thereby obviating the dangers incident to common blinders or winkers, as hereinbefore explained, my said invention being, moreover, by slight modifications, capable of being employed as a protector over the eyes of the animal, permitting sufficient sight or vision therethrough for the wants of the animal, and at the same time preventing the access of strong currents of air and particles of dust or other injurious material to the eyes.

My said invention comprises certain novel means, hereinafter particularized in the claims, whereby said objects are effectually secured.

Figure 1 is a side view and partial sectional view of a blinder or winker embracing one feature of my invention. Fig. 2 is a transverse sectional view taken in the line $x$ $x$ of Fig. 1. Fig. 3 is a side view showing another feature of my said invention, and Fig. 4 is a transverse sectional view taken in the line $y$ $y$ of Fig. 3.

A is the sheet or piece of wire-cloth, of any suitable size or circumferential configuration. B is a rim formed of plastic material of any appropriate kind—as, for example, "celluloid," so termed, or gutta-percha, or any other material capable of being applied in a plastic condition and subsequently permitted or caused to harden. This material—as, for example, celluloid—in its plastic condition, is placed around the edges of the piece or sheet A, and is pressed upon the opposite sides of said edges in relation therewith, (indicated more fully in Figs. 2 and 4,) thereby forming a rim around said piece or sheet A, the opposite sides of the said rim being upon the opposite sides of the piece or sheet and pressed inward upon the said piece or sheet and into the meshes thereof in such manner as to firmly unite or connect the rim thus formed of the plastic material to the said piece or sheet, whereupon the said plastic material is allowed to harden, and, becoming stiff and rigid, forms a strong rim around the sheet A, which retains the same, so that the rim and the sheet together constitute a blinder or winker, which may be attached to the headstall or bridle by any of the means usually employed for attaching the ordinary blinder or winker to a headstall or bridle—as, for example, by straps C C, attached to the rim B by rivets $a$. It will be observed that by this means the blinder or winker, of the usual size or contour, but of a foraminated character, capable of permitting the air to pass through, and possessed of the advantages hereinbefore set forth, may be manufactured at a small portion of the cost of the blinders or winkers of leather or like material heretofore in use. The rim B may be of any suitable width or thickness and of a flat form, or, when preferred, of the dish shape indicated in Fig. 4.

A further feature of my said invention consists in the construction of the foraminated blinder or winker with embossed concave or convex portions, which may be of ornamental configuration or lens-shaped, or of a form calculated to enable the blinder or winker to conform to the forehead of the animal and fit closely over the eyes. In the latter case a correspondingly-modified form will of course be given to the rim B. This embossing of the foraminated material of which the piece or sheet A is formed may be performed by the use of suitable dies, one of which is of convex shape, to form the concave side of the embossed portion of the piece or sheet A, and the other of which said dies is of concave form, corresponding to that of the die first named, and calculated to act upon the convex side of the said piece or sheet A. The plastic material of which the rim B is composed may be applied by simple manipulation or by means of suitable dies conforming in shape to the contour to be given to the said rim when finished, and arranged to compress the material around or upon the circumferential edges of the piece or sheet A. When desired, finely-perforated sheet metal may be substituted in place of wire-cloth for the piece or sheet A. The wire-cloth may be of any suitable mesh, and may vary within wide limits. When the perforated sheet metal is used, the number and size of the perforations may also be varied within wide limits. They should be of such character as to permit the ready passage of air through the blinder or winker, together with such particles of dust or grit that may be carried through the air.

It will be observed that when the rim B has the dish shape shown in Figs. 3 and 4 the circumference of the piece or sheet A must be bent to conform thereto, as illustrated in Fig. 4. This may be done by the same operation and with the same dies, by the use of which the embossed portions hereinbefore described are given to said piece or sheet.

What I claim as my invention is—

1. As an improved article of manufacture, a blinder or winker for headstalls or bridles, composed of a foraminated piece or sheet, A, and a circumferential rim, B, of celluloid or equivalent plastic material, attached to the circumference of said piece or sheet, substantially as and for the purpose herein set forth.

2. The combination of an embossed concave or convex foraminated piece or sheet, A, and a surrounding rim, B, of plastic material, substantially as and for the purpose herein set forth.

WILLIAM W. BEACH.

Witnesses:
GUNVALD AAS,
JOHN H. FISHER.